United States Patent [19]
Grant

[11] Patent Number: 5,451,197
[45] Date of Patent: Sep. 19, 1995

[54] ROLL ASSEMBLY WITH ALIGNMENT SPACER

[76] Inventor: Kenneth R. Grant, 211 Cardington Ave., Piedmont, S.C. 29673

[21] Appl. No.: 300,438

[22] Filed: Sep. 2, 1994

[51] Int. Cl.⁶ .............................................. B23P 15/00
[52] U.S. Cl. ........................................ 492/16; 492/45
[58] Field of Search ............... 492/16, 45, 47; 19/258, 19/259, 295

[56] References Cited

U.S. PATENT DOCUMENTS

| | | | |
|---|---|---|---|
| 2,417,239 | 3/1947 | Courtney | 19/258 |
| 2,704,393 | 3/1955 | Swanson | 29/895.21 |
| 2,730,771 | 1/1956 | Beck et al. | 19/295 |
| 2,885,247 | 5/1959 | Schlums | 384/475 |
| 2,948,024 | 8/1960 | Swanson | 19/295 |
| 2,979,784 | 4/1961 | Cotchett | 19/295 |
| 3,008,194 | 11/1961 | Sommer | 19/295 |
| 3,052,953 | 9/1962 | Swanson | 19/295 |
| 4,183,127 | 1/1980 | Suzuki | 19/295 |
| 5,267,932 | 12/1993 | Grant | 492/20 |

Primary Examiner—Irene Cuda
Assistant Examiner—Marc W. Butler
Attorney, Agent, or Firm—Ralph Bailey

[57] ABSTRACT

A top roll assembly includes a cartridge having an enlarged annular shoulder (A) carried internally intermediate its ends positioning bearings (B) and an alignment spacer with an annular ring (C) opposite the annular shoulder and flanges (D) at each end engaging an inner race of the bearings so as to maintain the bearings in an assembled relation and removably positioned upon a shaft by an end screw (E).

5 Claims, 2 Drawing Sheets

ROLL ASSEMBLY WITH ALIGNMENT SPACER

BACKGROUND OF THE INVENTION

This invention relates to an improved roll assembly including a removable cartridge incorporating an alignment spacer for positioning bearings in spaced relation within a shell, in proper alignment for reception upon a shaft of a top roll such as illustrated in U.S. Pat. No. 5,267,932.

When utilizing top roll assemblies constructed in accordance with the above patent, difficulties are encountered in positioning or installing the disposable cartridges upon the reduced shaft portions of the top roll because the spacer provided for retaining the bearings in proper spaced aligned relationship when on the shaft is ineffective in positioning the parts for reception upon the shaft during installation. The shaft would itself be difficult to align for receiving the reduced ends of a top roll shaft. This is because the spacer which should be in proper position engaging the inner races of the ball bearing comes out of alignment because the outer diameter is such as to permit engagement of the spacer with the inner races of the bearings only thus permitting the spacer to come out of alignment when not on the shaft. Such a spacer which is large enough to engage the intermediate shoulder portion for positive alignment within the shell would interfere with the operation of the ball bearing because both the inner and outer races would be engaged thereby. The problem therefore arose of providing a suitable spacer which would be positively positioned for receiving the reduced portions of the top roll shaft while at the same time engaging only the inner ends of the inner races of the ball bearings. Unless the spacer is in proper alignment for receiving the top roll shaft the difficulties of mounting the cartridges upon the shafts present a major deterrent to their use in a textile mill or other industrial application.

Accordingly, it is an important object of the present invention to provide an improved top roll assembly useful for top rolls of a textile drafting system wherein the bearings may be properly positioned and aligned within the shell or housing for receiving the reduced shaft portions of a top roll for in turn positioning a cot for ready replacement for use in textile drafting systems.

Another important object of the invention is the provision of a center alignment spacer for use in a replaceable cartridge which is disposable and replaceable upon a counterlevered shaft wherein a bore within the spacer must be maintained in proper alignment with the bores within the bearings for receiving the shaft in proper alignment for installation thereon.

SUMMARY OF THE INVENTION

Accordingly, positioning a cartridge upon a top roll for disposably carrying a cot is facilitated by providing a center alignment spacer for maintaining the parts of a cartridge in proper alignment for readily replacing a worn cot wherein either the sealed bearings of the cartridge or the cot itself become excessively worn. The center alignment spacer has a major diameter defined by a ring which is secured in closely fitting relation opposite the inner surface of a shoulder carried intermediate the ends and internally of a shell. Flanges having a minor diameter are carried in alignment with a bore within the spacer and extending outwardly of the ring only sufficiently to engage the inner races of the respective bearings.

Another important object of the invention is achieved by avoiding the use of snap rings and the necessary grooves for retaining the snap rings on the shaft and for positioning the inner races of such bearings wherein replacement of the cartridges is facilitated because of the parts being in proper alignment for reception of the shaft.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a top roll assembly including a cartridge removably secured in assembled relation upon a shaft. An elongated hollow shell or housing has an enlarged annular shoulder A carried internally intermediate its ends. A pair of sealed ball bearings B is carried within the shell, each sealed bearing having an outer race and an inner race and being positioned within a recess in the shell on each side of the enlarged annular shoulder A, the outer race of each bearing engaging the shoulder. An alignment spacer between the bearings includes an annular ring C having a central bore and an outer surface closely received within the shell opposite the enlarged annular shoulder and in longitudinally spaced relation to the bearings at each end thereof. An annular flange D extends outwardly from the ring adjacent the bore at each end of the ring engaging an inner race of each of the bearings. A retaining member E is received axially upon an end of the shaft within the shell retaining the sealed bearings and spacer within said shell for installing the cartridge and removably positioning the cartridge upon said shaft with the bearings retained on the shaft. Thus, the cartridge is readily positioned on the shaft because the ring C maintains the bearings and spacer in proper alignment while the flanges engage only the inner races of the bearings.

Figure 1:
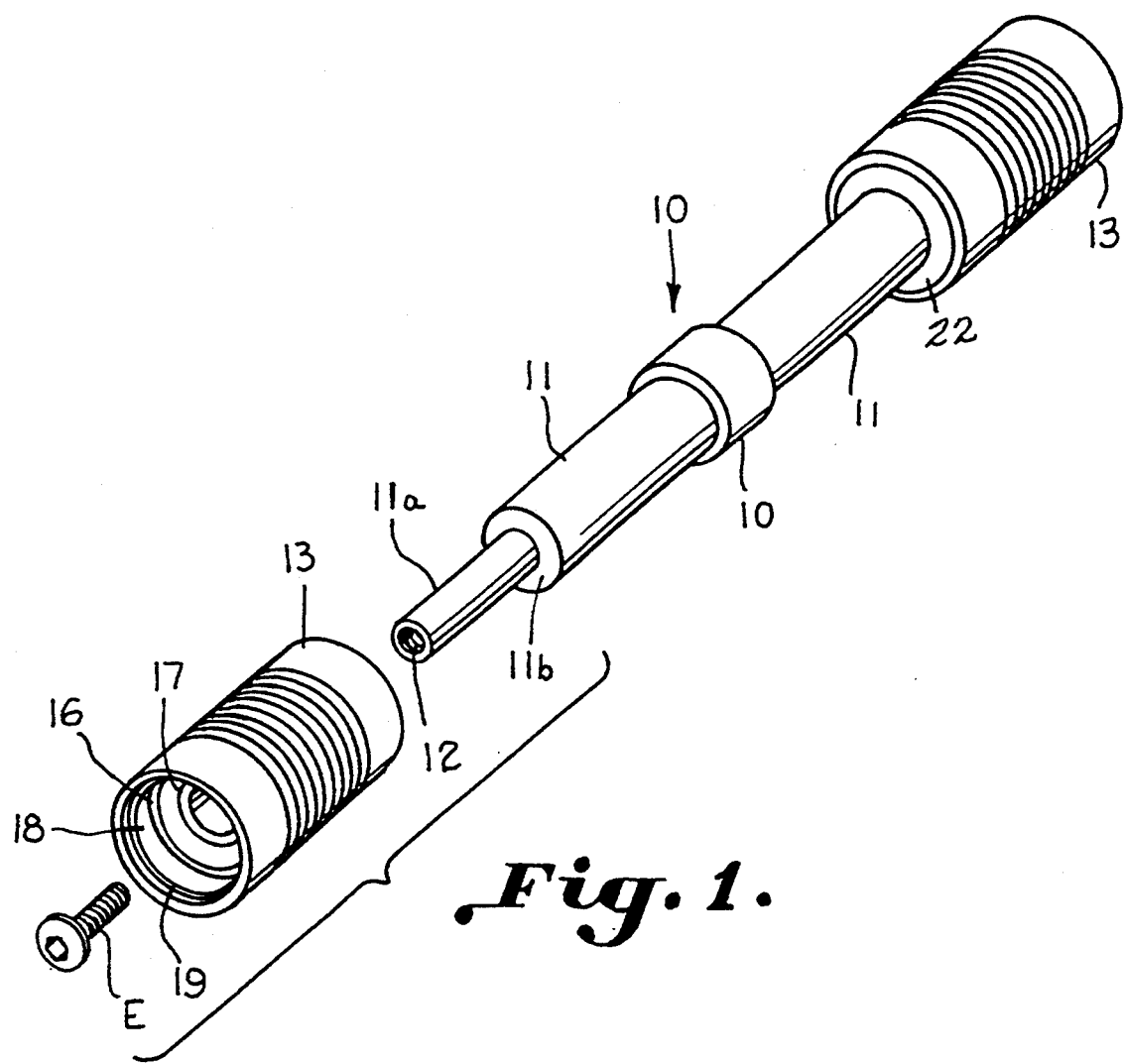
FIG. 1 is a perspective view illustrating a disposable cartridge constructed in accordance with the present invention preparatory to installation thereof upon a reduced shaft portion of a top roll assembly for positioning of a new cot.

The cartridges may be constructed so as not to require any lubrication or maintenance and the center alignment spacer positions the parts for ready reception upon a shaft for replacement purposes. A lint shield is carried on an inner end of said shells while an end cover provided by an outer overhanging portion of the shell extends over the assembly screw after the cartridge has been installed upon the shaft. The cartridge is positioned upon an elongated top roll shaft broadly designated at 10 (FIG. 1). The shaft 10 includes a central mounting 10a and intermediate shaft members 11 extend on each side thereof terminating in reduced end portions 11a. Each of the end portions 11a have an internally threaded bore 12 in a free end for threadably receiving an end screw E for maintaining the respective cartridges in assembled relation and positioning on an end of the top roll shaft 10.

Figure 2:
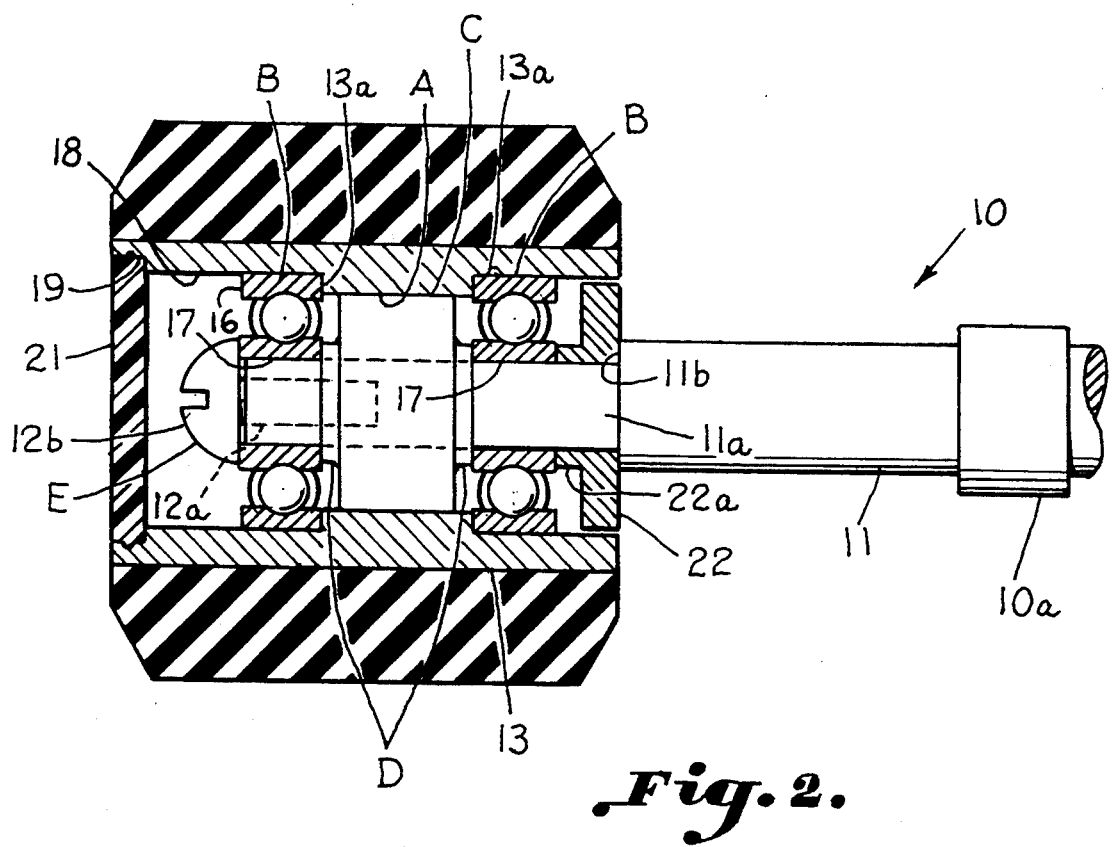
FIG. 2 is a longitudinal sectional elevation illustrating a cartridge and the center alignment spacer positioning the bearings and shell upon the top roll shaft carrying a cot positioned thereon.

Each of the cartridges includes a cylindrical shell or housing 13 having an enlarged annular internal shoulder A (FIG. 2) intermediate at its ends. Each of the shells 13 have shoulders 13a adapted to engage the inner portion of an outer race of each of the bearings. A pair of sealed ball bearings illustrated at B each have respective outer races 16 and inner races 17. The ball bearings are carried within the reduced end portions 18 defined by the enlarged annular shoulder A. Further reduced portions 19 at the outer ends of each shell accommodate an end cap 21 while a lint shield 22 is carried at inner ends. The lint shields 22 each have a concentric flanged portion 22a extending inwardly engaging an outer portion of an adjacent inner race 17.

Figure 3:
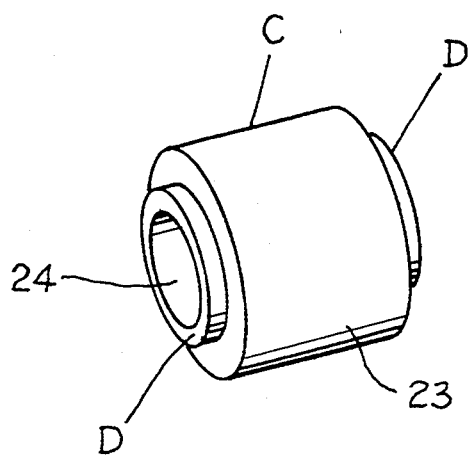
FIG. 3 is a perspective view illustrating a center alignment spacer constructed in accordance with the present invention for maintaining the parts of a cartridge in proper alignment for installation of a cartridge upon a shaft.

The alignment spacer has a central annular ring C which defines an outer major diameter 23 which is carried in closely fitting relation to the inner diameter of the enlarged annular shoulder A. The annular ring C and the annular flanges D have an inner bore 24 (FIG. 3) for reception upon the reduced shaft portions 11a. The reduced shaft portion defines a shoulder 11b at each end so as to engage an outer face of the lint shield 22 urging the flange 22a into engagement with the adjacent inner race 17. By inserting the reduced shaft portion 11a within the bores defined by the inner races of the ball bearings and the center alignment spacer the screw E may be positioned and by means of the threaded shank 12a threadably engage the internally threaded bore 12 for drawing the ball bearings having engagement with an adjacent inner race, the annular flanges D and the lint shield flange 22a together for a compression fit between the enlarged head 12b of the screw and the shoulder portion 11b.

It is important that the inner races of the bearings be slidable on the shaft while the outer races 16 have a pressed fit on the shell. By turning the screw pulling the parts together a clamping arrangement is provided to prevent undesired rotation of the parts. While the cartridge construction of the invention has been described for positioning cots upon top rolls for drafting textile fibers the invention may also be useful in connection with providing nip rolls for yarn delivery, conveyor delivery rolls, as well as rolls used for tensioning the tape on spinning frames and in connection with many other applications wherein fixed counterlevered shafts carry roll assemblies thereon.

While a preferred embodiment of the invention has been described using specific terms, such description is for illustrative purposes only, and it is to be understood that changes and variations may be made without departing from the spirit or scope of the following claims.

What is claimed is:

1. A roll assembly including a cartridge removably secured in assembled relation upon a shaft comprising:
   an elongated hollow shell having an enlarged annular shoulder intermediate its ends;
   a pair of bearings carried within said shell each having an outer race and an inner race and being positioned within a recess in said shell on each side of said enlarged annular shoulder, said outer race of each bearing engaging said shoulder;
   an alignment spacer between said bearings;
   said alignment spacer including:
   an annular ring having a central bore and an outer surface closely received within said shell opposite said enlarged annular shoulder and in longitudinally spaced relation to said bearings at each end thereof;
   an annular flange Of reduced diameter extending outwardly from said annular ring adjacent said bore at each end of said annular ring engaging an inner race of each of said bearings; and
   a retaining member received axially upon an end of said shaft within said shell retaining said bearings and spacer within said shell for installing said cartridge and removably positioning said cartridge upon said shaft with said bearings retained on said shaft;
   whereby said annular ring is greater in diameter than said annular flanges and said cartridge is readily positioned on said shaft.

2. The structure set forth in claim 1 wherein said retaining member is a screw having an enlarged head engaging and clamping said bearings and said alignment spacer within said shell.

3. The structure set forth in claim 2 wherein said annular ring and said annular flanges are of integral construction.

4. The structure set forth in claim 1 wherein said retaining member is a screw having a retaining head, and wherein a said cartridge is positioned at each end of a top roll shaft for drafting textile fibers engaged by cots carried by said cartridges on said shaft.

5. The structure set forth in claim 4 wherein each end of said shell has a reduced portion respectively carrying a shield on one end and an end cap extending over said screw on the other end.

* * * * *